Feb. 11, 1941.     A. C. SEWALL     2,231,552
INSOLE AND MATERIAL FOR MAKING THE SAME
Filed July 14, 1937     2 Sheets-Sheet 1
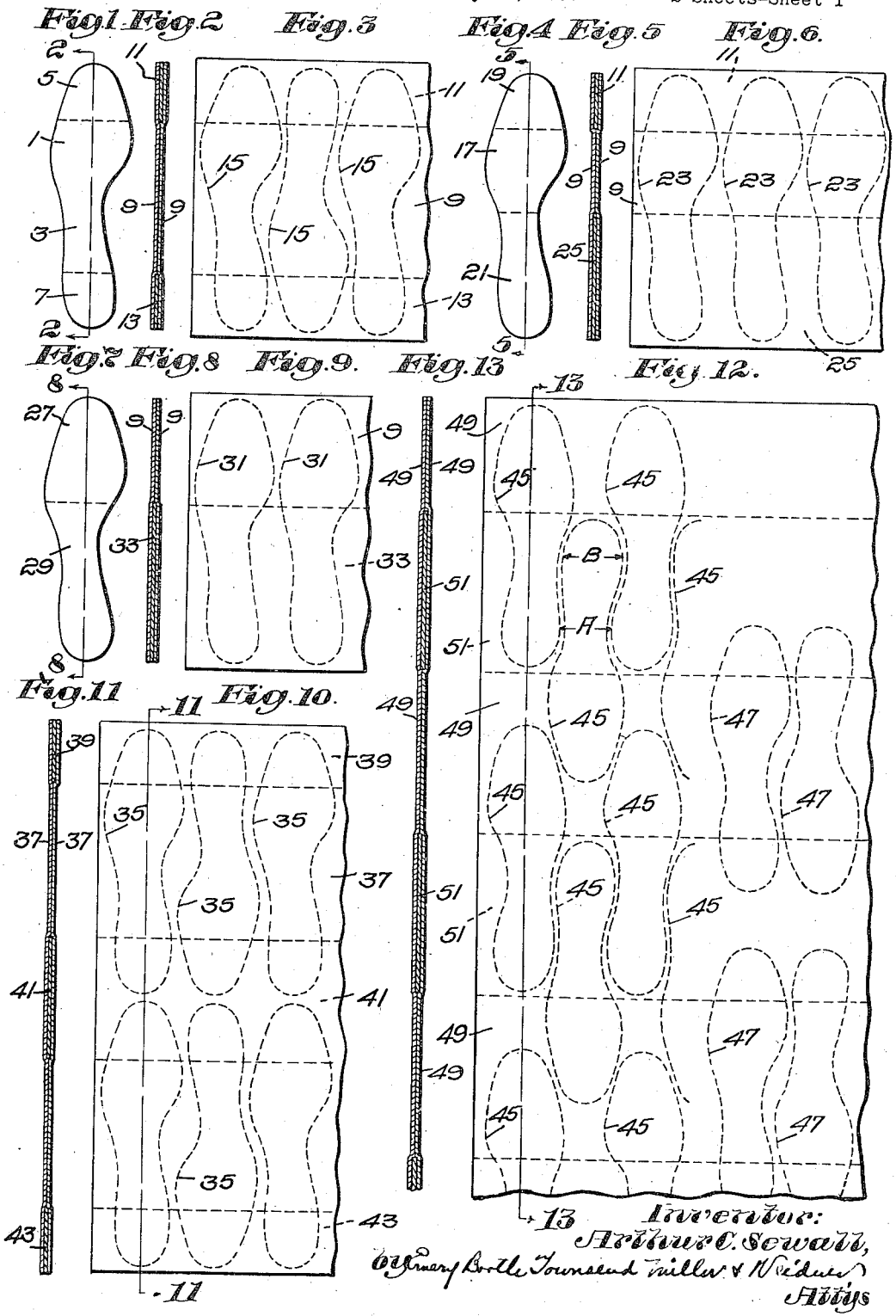

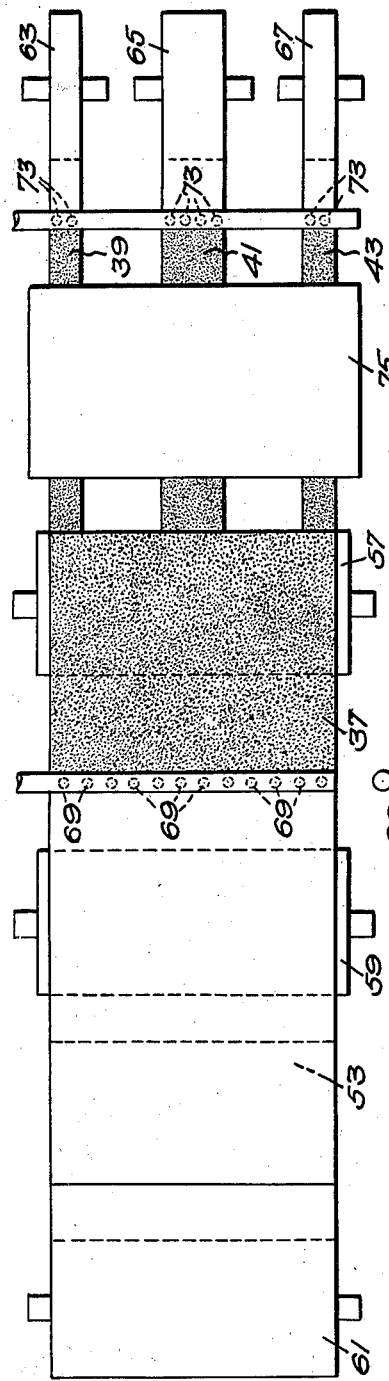
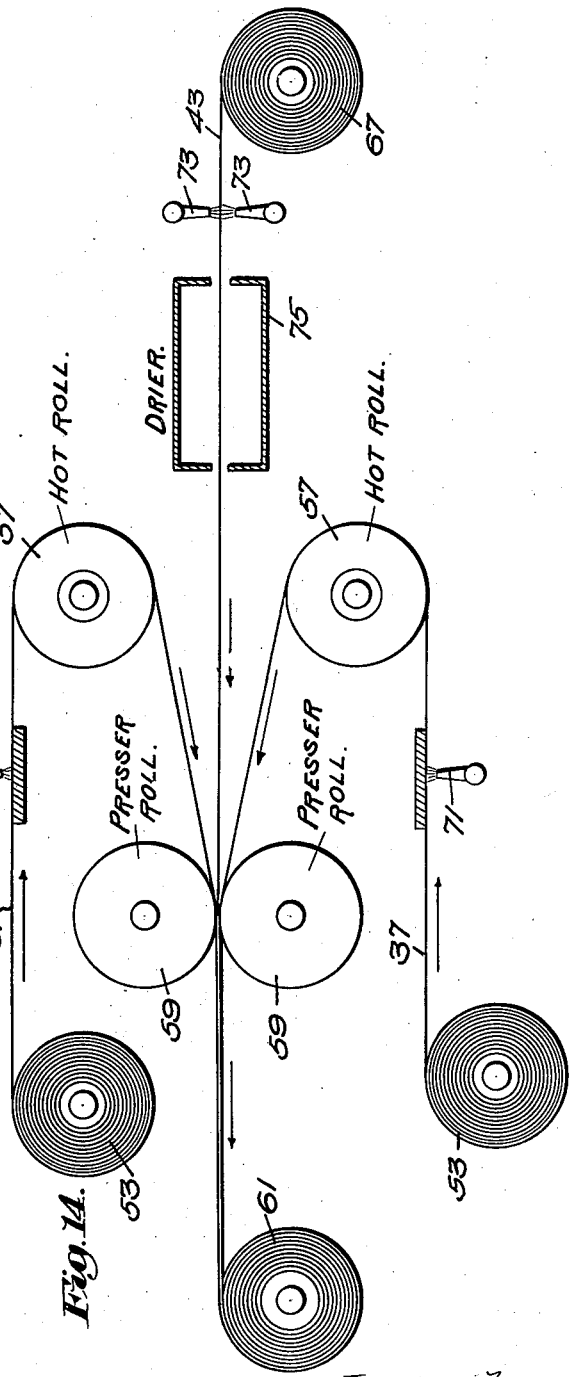

Patented Feb. 11, 1941

2,231,552

UNITED STATES PATENT OFFICE 2,231,552

INSOLE AND MATERIAL FOR MAKING THE SAME

Arthur C. Sewall, Auburn, Maine

Application July 14, 1937, Serial No. 153,542

17 Claims. (Cl. 36—44)

My invention relates to insoles and methods of and materials for making the same.

The invention, which has among its objects the provision of an insole of improved utility which may be made by simpler mechanical operations than heretofore, will be best understood from the following description when read in the light of the accompanying drawings, the scope of the invention being more particularly pointed out in the appended claims.

In the drawings:

Fig. 1 is a plan of one form of insole constructed according to the invention;

Fig. 2 is a section on the line 2—2 of Fig. 1;

Fig. 3 is a plan of a strip from which the insoles according to Figs. 1 and 2 may be cut or died;

Fig. 4 is a plan of another form of insole according to the invention;

Fig. 5 is a section on the line 5—5 of Fig. 4;

Fig. 6 is a plan of a strip from which the insoles according to Figs. 4 and 5 may be cut or died;

Fig. 7 is a plan of a third form of insole according to the invention;

Fig. 8 is a section on the line 8—8 of Fig. 2;

Fig. 9 is a plan of a strip from which the insoles according to Figs. 7 and 8 may be cut or died;

Fig. 10 is a plan of another form of strip from which the insoles according to Figs. 1 and 2 may be cut or died;

Fig. 11 is a section on the line 11—11 of Fig. 10;

Fig. 12 is a plan of still another form of strip from which the insoles according to Figs. 7 and 8 and Figs. 1 and 2 may be cut or died;

Fig. 13 is a section on the line 13—13 of Fig. 12;

Fig. 14 is a schematic elevation of one form of apparatus for making the strips according to Figs. 10 and 11; and Fig. 15 is a schematic plan according to Fig. 14.

Referring particularly to Figs. 1, 2 and 3, the insole illustrated by these figures comprises a ball portion 1 and shank portion 3 which are relatively flexible, while the toe portion 5 and heel portion 7 are relatively stiff. As shown, the insole is formed of two layers 9 of relatively flexible material, between which at the toe portion is a sheet of relatively stiff material 11 and at the heel portion a sheet of relatively stiff material 13, these sheets throughout their contacting surfaces being preferably secured together by means of cement as, for example, latex or rubber solution which is applied to the surfaces of the sheets and dried sufficiently to render it tacky before assembling the sheets to form the strip from which the insole is cut.

The insoles according to Figs. 1 and 2 may be cut or died, as indicated by the dotted lines 15, from an elongated strip, a fragment of which is shown in Fig. 3, having a cross-section like that illustrated in Fig. 2. This strip consists of elongated sheets of the relatively flexible material 9 and elongated spaced bands of the relatively stiff material 11 and 13. The flexible sheet material 9 is preferably fibrous cellulose material, such as bibulous paper or flannel, impregnated with latex or rubber solution or dispersion. It may, however, be of paper, flannel or felt free from rubber, such as commonly employed for insoles. The bands of relatively stiff material 11 and 13 preferably are of relatively stiff, hard fiberboard which will act to stiffen the toe and heel portions and prevent pulling through of the lasting and heel attaching nails.

Preferably the materials of which the strip illustrated by Figs. 2 and 3 is formed may be relatively thin, for example, but without limitation thereto, the strips 9 may be each of about 1½ irons in thickness, and the bands 11 and 13 of about 1 iron in thickness, which will present offset portions of about 0.01" at each side of the strip between the thicker heel and toe portions and the thinner ball and shank portions, which is not objectionable.

It will be observed that the above described insole strip from which the insoles are cut is so formed as to present a construction in which no skiving is necessary. Further, the fiberboard or other stiff material is concealed, making an insole of pleasing appearance and presenting one the opposite sides of which throughout their extent are of material to which the shoe uppers may be readily cemented, it being understood that in the shoe factory it is commonly expedient in lasting the shoes to cement the uppers to the insole by use of wet latex or rubber solution, which can be readily done when the cement is applied to an exposed surface of rubber impregnated cellulose material, but cannot be done when the cement is applied to an exposed surface of fiberboard without first resorting to the expensive, time consuming, and troublesome expedient of permitting the latex or rubber solution to dry to a requisite degree of tackiness.

The insole according to Figs. 4 and 5 has a flexible ball portion 17, while the toe portion 19 and shank and heel portions 21 are relatively stiff. This insole may be cut or died, as indicated by the dotted lines 23, from the strip illustrated in Fig. 6, which strip is formed exactly like the above described strip illustrated by Fig. 3 and of the same materials, except that the band of stiff material 25 has a width approximately that of the combined lengths of the heel and shank portions of the insole.

The insole illustrated by Figs. 7 and 8 has a flexible toe and ball portion 27, while the heel and shank portions 29 are relatively stiff. This insole may be cut, as indicated by the dotted lines 31, from the strip illustrated by Fig. 9, which is like the strip illustrated in Fig. 3 except that there is but one band 33 of relatively stiff material, that band having a width approximately that of the combined lengths of the heel and shank portions of the insole.

To avoid or reduce to a minimum the splitting of the strips of flexible material as received from the manufacture thereof so as to form the strips 9 of relatively narrow width employed in the insole strips illustrated by Figs. 3, 6 and 9, respectively, the insole strips may be so formed as to employ wider strips of flexible material as illustrated by Figs. 10 and 11 from which the insoles illustrated by Figs. 1 and 2 may be cut or died as indicated by either the dotted lines 35 of Fig. 10 or the dotted lines 15 of Fig. 3. The strip according to Figs. 10 and 11 comprises relatively wide strips 37 of the flexible material, between which are spaced bands 39, 41 and 43 of the relatively stiff material. As shown, the bands 39 and 43 are of width approximately the length of the toe or heel portion of the insole depending upon which has the greater length, while the bands are spaced apart a distance equal to the combined lengths of the ball and shank portions of the insoles.

Figs. 12 and 13 illustrate another form of strip particularly useful for cutting therefrom the insoles illustrated by Figs. 7 and 8 which may be cut or died from the strip along the dotted lines 45, as indicated in Fig. 12. If desired, the insoles according to Figs. 1 and 2 may also be cut from this strip along the dotted lines 47 in Fig. 12, but with considerable waste of material. As illustrated, the strips according to Figs. 12 and 13 consist of sheets 49 of the flexible material between which are spaced bands 51 of the relatively stiff material of width approximately the combined lengths of the heel and shank portions of the insoles, and, if it is desired to have this strip so formed that the insoles according to Figs. 1 and 2 also may be cut therefrom, the spacing between the bands is equal to the combined lengths of the shank and ball portions of the insoles. Preferably the bands of stiff material adjacent the two edges of the strip are spaced from those edges a distance approximately the combined lengths of the toe and ball portions of the insoles, and it will be observed that, if desired, but one band of the stiff material may be employed spaced that distance from the opposite edges of the strip if only the insoles illustrated by Figs. 7 and 8 are to be cut from the strip and wastage of material is outweighed by the convenience of handling a narrow strip. In cutting the insoles according to Figs. 7 and 8 from the strip illustrated by Figs. 12 and 13, or from the modification thereof just mentioned, ordinarily material will be saved by cutting the heel and shank portions of a row of insoles from one of the bands 51, alternate insoles so cut being reversed on the strip so that the ball and toe portions are cut from the flexible portions of the strip at opposite sides of that band. Not necessarily, but in some instances, where the heel portion is relatively wide compared to the width of the shank, the dimension A between the heel portions of insoles facing in the same direction on the strip may be less than the dimension B indicating the maximum width of the heel portion.

Various other forms of insole strips suitable for cutting therefrom the insoles above described will be obvious from the foregoing description.

In Figs. 14 and 15 is schematically illustrated a method of forming the strip according to Figs. 10 and 11, but it will be understood that the strips indicated by the other figures may be similarly formed.

Referring to Figs. 14 and 15, two axially rotatable rolls 53 of the flexible material 37 of the insole strip illustrated by Figs. 10 and 11 are provided. The material 37 from these rolls is led over hot rolls 57 and guided in superimposed relation between a pair of presser rolls 59 and wound into a roll 61. Three axially rotatable rolls 63, 65 and 67 of the bands of relatively stiff material 39, 41 and 43, respectively, of the insole strip illustrated in Figs. 10 and 11 are provided, and the material from these rolls is led between the material from the rolls 53 and passes with the latter between the presser rolls. As schematically illustrated, the upper side of the sheet 37 from the upper roll 53 has associated therewith a row of spray nozzles 69, while the under side of the sheet 37 from the lower roll 53 has associated therewith a row of spray nozzles 71, and associated with the opposite sides of each of the bands 39, 41 and 43 passing from the rolls 63, 65 and 67, respectively, are rows of spray nozzles 73. These spray nozzles in each instance act to apply to the adjacent surface of the sheet or band a layer of adhesive substance, preferably latex. When the sheets from the rolls 53 pass over the hot rolls 57 the latex is dried sufficiently to render it tacky, and the same effect is secured in respect to the adhesive substance on the bands 39, 41 and 43 by passing those bands through a drier conventionally indicated at 75. Thus when the flexible sheets and relatively stiff bands pass between the presser rolls they are squeezed together and caused to adhere.

It will be understood that in lieu of the hot rolls 57 suitable driers and guide rolls may be employed. It will also be understood that the flexible material 37 from the rolls 53, being preferably of rubber impregnated cellulose material, is relatively compressible, and when it passes through the presser rolls will be compressed sufficiently to cause those portions of that material which are between the bands 39, 41 and 43 to be pressed into contact and to adhere to each other, this compressibility further tending to cause the portions of the flexible material adjacent the stiff material to be reduced in thickness so as to minimize to a degree the difference in thickness between the 2-ply and 3-ply portions of the strips.

It will be understood that within the scope of the appended claims wide deviations may be made from the forms of the invention described without departing from the spirit of the invention.

I claim:

1. An elongated sheet of material suitable for cutting insoles therefrom comprising layers of relatively flexible sheet material, a plurality of longitudinally extending bands of relatively stiffer sheet material between said layers, said bands being spaced apart approximately a distance equal to the combined lengths of the shank and ball portions of the insole, and at least one of said bands intermediate the edges of the sheet being of width approximately the combined lengths of the heel and shank portions of the insole, said layers and bands being permanently secured together.

2. A sheet according to claim 1 in which said layers are of rubber impregnated cellulose fiber sheet material and said bands are of relatively stiff fiberboard, the layers and bands being cemented together.

3. An elongated sheet of material suitable for cutting insoles therefrom comprising layers of relatively flexible sheet material, a pair of spaced adjacent bands of relatively stiffer sheet material between said layers, said bands each being of width sufficient to include the heel and shank portions of insoles cut transversely of the sheet, and the space between said pair of bands being of width sufficient to include the ball and toe portions of insoles the heel and shank portions of which are included by said pair of bands, said layers and bands being permanently secured together.

4. A sheet according to claim 3 in which said layers are of rubber impregnated cellulose fiber sheet material and said bands are of relatively stiff fiberboard, the layers and bands being cemented together.

5. An insole formed wholly of relatively flexible material at the ball portion thereof comprising superimposed sheets of relatively flexible rubberized fibrous material of such nature that shoe uppers when desired may be cemented thereto with wet latex, which sheets are coextensive with the entire area of the insole and form the opposite exposed surfaces thereof whereby said insole may be used interchangeably for right and left shoes so cemented, and, between said sheets, at at least one of the end portions of the insole exclusive of the ball portion thereof, a sheet of stiffening material, all said sheets being in permanently secured together relation.

6. An insole according to claim 5 in which there is a sheet of stiffening material of hard fiberboard between the sheets of flexible material at the heel portion of the insole for preventing pulling through of lasting and heel attaching nails at said portion.

7. An insole according to claim 5 in which there is a pair of the relatively flexible sheets of rubberized fibrous material forming the opposite exposed sides, respectively, of the insole, which sheets are in cemented together contacting relation at the portions of the insole not occupied by interposed sheet stiffening material.

8. An insole according to claim 5 having sheet stiffening material at each of opposite end portions of the insole.

9. An insole according to claim 5 having sheet stiffening material at each of opposite end portions of the insole and respectively coextensive with substantially the toe and heel portions, substantially the entire shank and ball portions being formed exclusively of the flexible material.

10. An elongated strip suitable for cutting a plurality of insoles therefrom comprising a pair of longitudinally extending exposed layers of relatively flexible material of width at least the length of an insole, a longitudinally extending band of relatively stiff sheet material between said layers, said layers and band being in cemented together relation, said band being of such width and so positioned between said layers that a full length insole having each of opposite exposed sides for the entire area thereof formed of said flexible material may be cut from said strip transversely thereof to include at one end portion the material of said band without including it at the ball portion, the flexible material being of substantially like sheet material whereby insoles so cut from said strip may be used interchangeably in right and left shoes.

11. A strip according to claim 10 in which the band of relatively stiff material is of such width and so positioned that a full length insole having each of opposite exposed sides for the entire area thereof formed of the flexible sheet material may be cut from said strip transversely thereof to include at its heel portion said stiff material but not include it at its ball portion, and in which the exposed layers are of rubberized fibrous sheet material of such nature that shoe uppers may be cemented to it with wet latex, whereby insoles so cut from said strip may be used interchangeably in right and left shoes so cemented.

12. An elongated strip suitable for cutting therefrom a plurality of like insoles having relatively stiff end portions spaced by a relatively flexible intermediate portion, comprising a pair of longitudinally extending exposed layers of relatively flexible material of width at least the length of an insole, a pair of longitudinally extending parallel bands of relatively stiff sheet material between said layers, which layers and bands are in cemented together relation; said bands being spaced apart a distance which is the length of the flexible intermediate portion of said insole, and being of such width that a full length insole having each of opposite exposed sides for the entire area thereof and the flexible intermediate portion thereof formed of said flexible material may be cut from said strip transversely thereof to include the material of said bands, respectively, at the opposite relatively stiff end portions of said insole for the entire area of said end portions, the flexible material being of substantially like sheet material whereby insoles so cut from said strip may be used interchangeably in right and left shoes.

13. A strip according to claim 12 in which the bands are spaced apart a distance which is approximately the combined lengths of the ball and shank portions of the insole and each band is wide enough to include either relatively stiff end portion of the insole.

14. A strip according to claim 12 in which the exposed layers are of rubberized fibrous material of such nature that shoe uppers may be cemented thereto with wet latex.

15. A strip according to claim 12 in which the bands are spaced apart a distance which is approximately the combined lengths of the ball and shank portions of the insole and each band is wide enough to include either relatively stiff end portion of the insole, the exposed layers being of rubberized fibrous material of such nature that shoe uppers may be cemented thereto with wet latex.

16. An elongated sheet of material suitable for cutting insoles therefrom comprising layers of relatively flexible sheet material, a plurality of longitudinally extending bands of relatively stiffer sheet material between said layers, said bands being spaced apart approximately a distance equal to the combined lengths of the shank and ball portions of the insole, at least one of said bands intermediate the longitudinal edges of the sheet being of width at least the combined lengths of the toe and heel portions of the insole.

17. A sheet according to claim 16 in which said layers are of ruber impregnated cellulose fiber sheet material.

ARTHUR C. SEWALL.